United States Patent
Reime

[19]

[11] Patent Number: 5,680,420
[45] Date of Patent: Oct. 21, 1997

[54] DEVICE FOR PRODUCING A NOISE DETECTOR SIGNAL

[75] Inventor: Gerd Reime, Schömberg, Germany

[73] Assignee: Nokia Technology GmbH, Pforzheim, Germany

[21] Appl. No.: 196,652

[22] Filed: Feb. 15, 1994

[30] Foreign Application Priority Data

Feb. 26, 1993 [DE] Germany .............. 43 05 961.9

[51] Int. Cl.$^6$ ............................................... H04B 1/10
[52] U.S. Cl. ..................... 375/350; 455/63; 455/296
[58] Field of Search .................... 375/223, 296, 375/346, 350, 227, 228; 455/50.1, 63, 278.1, 296

[56] References Cited

U.S. PATENT DOCUMENTS

| | | |
|---|---|---|
| 4,000,369 | 12/1976 | Paul, Jr. et al. . |
| 4,667,225 | 5/1987 | Kamda .................. 348/618 X |
| 4,864,561 | 9/1989 | Ashenfelter et al. .......... 370/81 |

FOREIGN PATENT DOCUMENTS

| | | |
|---|---|---|
| 0172590 | 2/1986 | European Pat. Off. . |
| 0181701 | 1/1989 | European Pat. Off. . |
| 0059379 | 9/1992 | European Pat. Off. . |
| 2351146 | 4/1975 | Germany . |
| 2512412 | 10/1976 | Germany . |
| 3307687 | 9/1984 | Germany . |
| 3703896 | 8/1987 | Germany . |
| 2058521 | 4/1981 | United Kingdom . |

OTHER PUBLICATIONS

DE Publication "Funkschau 1984", p. 60 of pamphlet 25 and p. 49 of pamphlet 261 from Funkschau 26/1984 and Funkschau 25/1984.

*Primary Examiner*—Stephen Chin
*Assistant Examiner*—Kevin Kim
*Attorney, Agent, or Firm*—Ware, Fressola, Van Der Sluys & Adolphson

[57] ABSTRACT

A noise signal filter (5) in a noise level detector (3) filters out the noise signals (Sr) to be determined from a useful signal (Sn) transmitted via transmission channel (1), and mutes the noise signal parts, which have a system reference line as their direct basis, through a rectifier (6) and an amplitude limiter (9) to a peak envelope demodulator (8). The latter produces an envelope curve from the input signal, with places in which only the amplitudes of the noise signal determine the level of the envelope curve. The level of these places is stored by a minimum level memory (11), which follows the input signal, and stores the lowest level value obtained so far. To compensate for a drift of the signal guiding the minimum level memory (11), a second minimum level memory (13) is provided, which stores the lowest minimum value obtained so far and routes it to a signal substracter (16), to compensate for the drift and to remove voltage differences from the tracking to the minimum level memories.

11 Claims, 4 Drawing Sheets

DEVICE FOR PRODUCING A NOISE DETECTOR SIGNAL

TECHNICAL FIELD

The invention concerns a device for producing a noise detector signal.

BACKGROUND OF THE INVENTION

In a transmission device for transmitting a useful signal, for example the transmission of audio signals representing an audio event, radio or television signals or data and other signals, additional noise signals are generally contained, which are superimposed on the useful signals, and which, during the evaluation and reproduction of this information, disturb or even falsify the reproduced information, or insert additional interfering information. For that reason, noise reduction devices are included in suitable areas of the transmission channels, which compensate at least for part of the transmitted noise spectrum.

In a noise reduction device, known from page 60 of pamphlet 25 and page 49 of pamphlet 26 of the DE-publication "Funkschau 1984", which operates according to the DNL-process to reduce noise in a tone transmission, the useful audio frequency signal is transmitted through a first transmission path, namely an all-pass network with constant frequency, in such a way, that the audio signal is phase-shifted 180° in the frequency range above the upper limit of the all-pass frequency. A second transmission path, which is parallel to the first, contains a high-pass and an attenuator that is controlled by the amplitude of the useful signal in the second transmission path, whose output signal is added by a summing element to the signal of the first transmission path. In the second transmission path, the high pass only transmits the high frequencies of the useful signal that are more sensitive to the noise, and because of the amplitude-controlled attenuator, only with small amplitudes of the useful signal in the higher frequency range of the useful signal. Due to the phase-shift of the higher frequencies in the first transmission path, the higher frequency range of the useful signal with small amplitudes is reduced or blanked out during the summation of the signals in the first and second transmission path, thereby reducing the interfering noise signals. However, in this case, the useful signal in this frequency range is also reduced in the same way.

In this known application, it is unsatisfactory that the control or regulation of the noise reduction does not result directly from the level of the noise signal, but from the amplitude of the useful signal, based on the knowledge that the noise interferes primarily with the high frequency range of a small useful signal.

In the known noise reduction circuit, the noise reduction takes place because signal parameters of the transmitted useful signal are altered in the noise reduction circuit. The phase of a predetermined frequency range of the transmission signal is inverted in the first transmission path of the noise reduction circuit. The transmitted signal is limited to a predetermined frequency range in the second transmission path of the noise reduction circuit. In addition, the amplitudes of the oscillations of the frequency-limited signal are attenuated there as a function of the useful signal level. This limitation, amplification or attenuation by the noise reduction circuit adjusts certain parameter values on the output side of the transmission signals of the noise reduction circuit, partly as a function of the useful signal level, thus producing a noise-reduced audio signal.

Another noise reduction circuit is used in the playback mode of a video recorder, for example. There, two signal channels with a high-pass filter each are connected to the transmission channel on the output side of the luminance signal, which determines the frequency range of the noise spectrum and has a differentiating effect on the parts of the useful signal that the high-pass filters lets through, in the presence of rapid jumps and steep slope of the video signal to be transmitted. One of the signal channels also contains a limiting amplifier, which highly amplifies the filtered noise signal, but limits the differentiated luminance signals transmitted by the filter in such a way, that the amplitude of these parts approximately equals the amplitude of the unamplified, differentiated luminance parts of the other signal channel. Subtracting the output signals of both signal channels essentially blanks out the differentiated luminance signal portions. Accordingly, the remaining signal is so attenuated, that its level corresponds approximately to the level of noise in the luminance signal. Both signals are routed to a signal subtracter, so that the noise signal, which is superimposed on the luminance signal, is attenuated or blanked out. In this instance as well, the limitation and/or the attenuation for optimization of the noise reduction is not controlled or adjusted by the level of the noise signal.

SUMMARY OF THE INVENTION

The invention therefore has the task of presenting a circuit arrangement for measuring the level of a noise or interference signal that is superimposed on a useful signal, and to produce an output signal that corresponds to the noise level. The invention successfully fulfills this task with the attributes of the circuit arrangement, that is, by a rectifier (6) connected downstream of the noise signal filter (5), a peak envelope demodulator (8) connected downstream of the rectifier (6), for producing a demodulator signal (Sf) that corresponds to the level (pr) of the demodulated enveloe curve, and by a minimum level memory circuit (11) connected downstream of the peak envelope demodulator (8), for storing and transmitting the lowest level (pm) of the peak envelope demodulator's output signal (Sf), which has so far been routed to the input of the minimum level memory circuit.

The invention essentially starts with the knowledge that when a useful signal is transmitted, them are always moments when the level of the useful signal does not change, or changes very little, where, during a differentiation of the useful signal, only the noise signal essentially remains in effect in these areas, and such moments are so frequent, that continuous coverage of them is possible. This knowledge is used to advantage by the invention.

A component of the invention, a rectifier before the peak envelope demodulation is therefore required, because the amplitudes of the noise oscillations and the differentiated parts of the useful signal are different on both sides of the reference line of the signal transmitted through the filter, and the two envelope curves obtained in this manner can interfere with each other due to their difference. A full-wave rectifier is significantly better than a half-wave rectifier, because the gaps which occur in the signal with half-wave rectification, are occupied by the parts of the signal not used by the half-wave rectifier, and which fold around the reference line, causing the time constant for the demodulation and the production of a demodulated envelope curve that approximates the actual envelope curve, to be significantly smaller. This increases the accuracy of the demodulated envelope curve with respect to the actual envelope curve of the signal to be demodulated by a multiple factor, so that such a demodulated envelope curve contains significantly more areas with the actual level of the noise signal than an envelope curve that was demodulated by a half-wave rectifier.

Another significant improvement in the accuracy of the demodulated envelope curve is achieved by an amplitude limiter connected downstream of the rectifier, which exclusively limits the amplitude of the part of the differentiated useful signal that exceeds the amplitudes of the filtered noise signal. During a peak envelope curve demodulation, if it is related to a signal integration, the parts of the differentiated useful signal that exceed the noise level are only insignificantly expanded, so that a smaller portion of the filtered noise signal is covered by the parts of the differentiated useful signal during the peak envelope demodulation.

A significant component of the invention is the read-out of the envelope curve minimums obtained with the peak envelope curve demodulation. The envelope curve can be stored in special configurations of the minimum level memory circuits provided to that effect, and it can be determined by shifting the reference line or by reading the level of the envelope curve minimums. An advantageous, particularly simple configuration of a minimum level memory circuit uses a storage capacitor with a high storage time constant. A loading or unloading path of this storage capacitor is controlled by an input signal of this path, in this instance the envelope curve signal, in such a way, that the loading and unloading path becomes effective at a predetermined, small difference between the stored voltage of the storage capacitor and the level of the guide signal at the input to the minimum level memory circuit, and loads or unloads the storage capacitor with a tracking time constant, which is smaller than the time constant of the peak envelope demodulator, when the level of the guide signal is smaller than the level of the storage capacitor by the amount of the predetermined difference, as long as this condition exists. This stores the smallest minimum of the demodulated envelope curve level obtained so far, in the storage capacitor during a time period that is a function of the storage capacitor's time constant.

However, it was shown that the above-named difference between the value of the stored level and the level of the input signal that controls the minimum level memory circuit is subject to a drift caused by temperature and other environmental and construction effects, which can extend to the level of the envelope curve signal that controls the minimum level memory circuit. For that reason it is advantageous that the signal muted to the peak envelope demodulator, possibly by means of a circuit that corresponds to the peak envelope demodulator, which has a time constant that is smaller by orders of magnitude than the time constant of the peak envelope demodulator, is also routed to a second minimum level memory circuit, whose storage time constant is significantly smaller than one drift period. The value of the level produced and transmitted by the second minimum level memory circuit is negatively added by a signal subtracter to the level of the first minimum level memory circuit, so that the level value transmitted by the first minimum level memory circuit is freed from the drift and difference between the control level and the storage level, and the output signal of the signal subtracter is proportional to the actual level value of the noise level superimposed on the useful signal.

With another advantageous development of the invention it is now possible, in a transmission arrangement with a transmission channel for transmitting a signal with at least one signal parameter, and with a parameter control device connected to the transmission channel, to adjust at least one signal parameter of the transmission signal to a predetermined value by means of a control signal at the input of the parameter control device, and using a device to produce a noise detector signal, which is connected to the transmission channel, and corresponds to the level of the noise signal superimposed on the useful signal, to optimize the signal parameters of the signal transmitted by the device immediately above the level of the interfering noise signal, so that the reproduction of the useful information of the transmission signal is disturbed or falsified as little as possible by the transmitted noise signals, when the output of the device that produces a noise detector signal is connected to the control input of the parameter control device, and the selection of the signal parameters to be controlled, and the adjusted value of the signal parameters, is a predetermined function P=f(pg) of the noise detector signal value. For example, filter networks, phase shifters, amplifiers, attenuators or other adjustable installations can be connected to the transmission channel, to affect one or more signal parameters of a signal transmitted by these installations. The concept of signal parameters comprises the magnitudes of the transmission signal such as the bandwidth of the frequency of its oscillations, the amplitude of its oscillations, the frequency-dependent amplitude ratio of its oscillations, the phase position of its oscillations with respect to a reference oscillation, the frequency spectra and many more.

BRIEF DESCRIPTION OF THE DRAWINGS

In the following, the invention is described in greater detail by means of advantageous configuration examples. The pertinent drawings show.

BEST MODE FOR CARRYING OUT THE INVENTION

Figure 1:
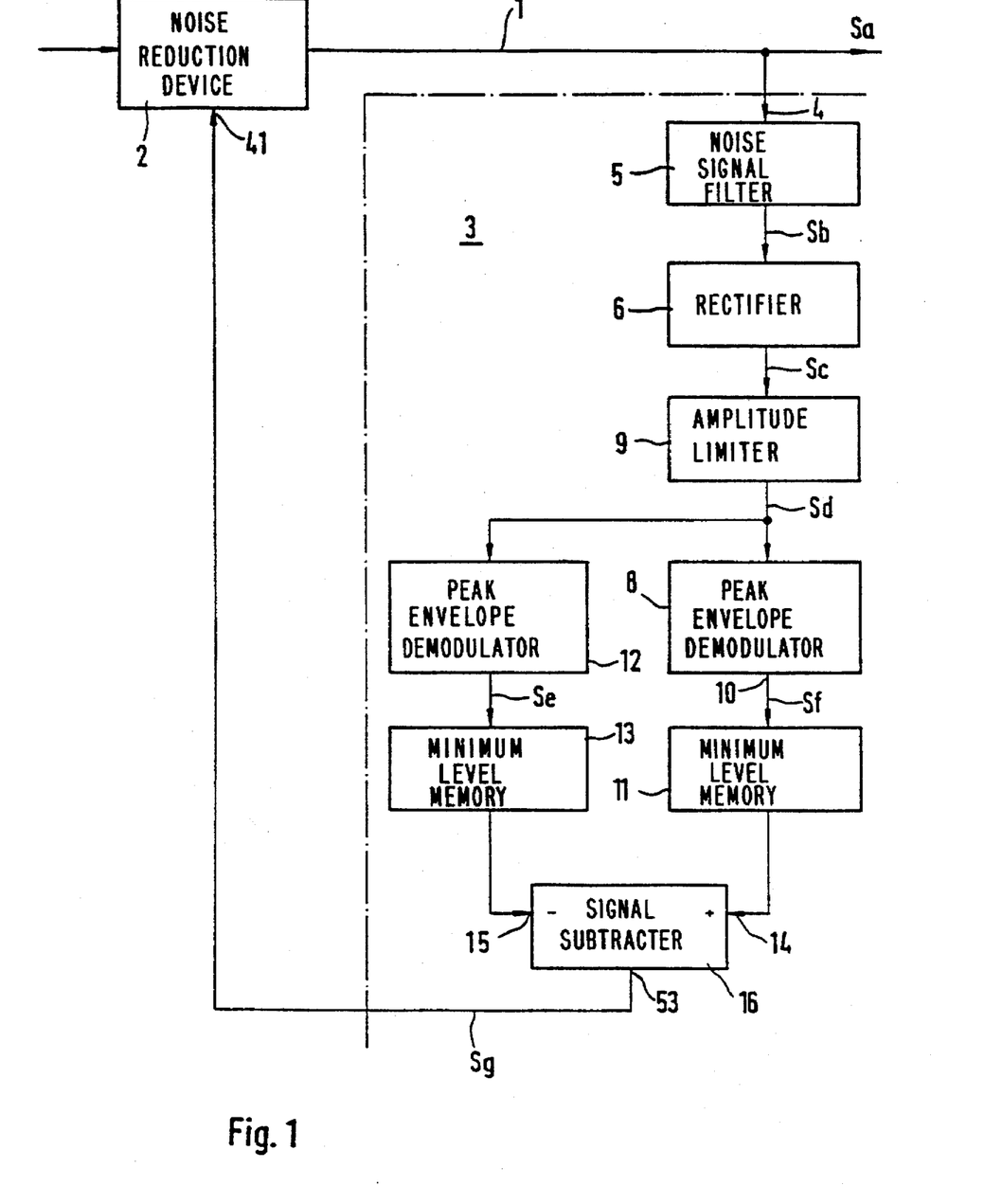
FIG. 1: a block diagram of a device for producing a noise detector signal that corresponds to the noise level.

In FIG. 1, a block circuit diagram illustrates a transmission channel 1 in the form of a horizontal line for transmitting a useful signal Sn, for example a video signal. This transmission channel 1 contains a device 2 for adjusting predetermined signal parameters of the signals Sa transmitted by the device 2. In the depicted configuration example, this device 2 is a device for reducing the noise signal Sr superimposed on the useful signal Sn, which is controlled or regulated by a device for producing a noise detector signal, hereafter described as noise level detector 3. This noise level detector 3 is connected to the transmission channel 1 by the input 4 of a noise signal filter 5. The noise signal filter 5 of noise level detector 3 determines the frequency range of the noise signal Sr superimposed on the useful signal Sn, which must be acquired by the noise level detector 3.

Figure 3A:
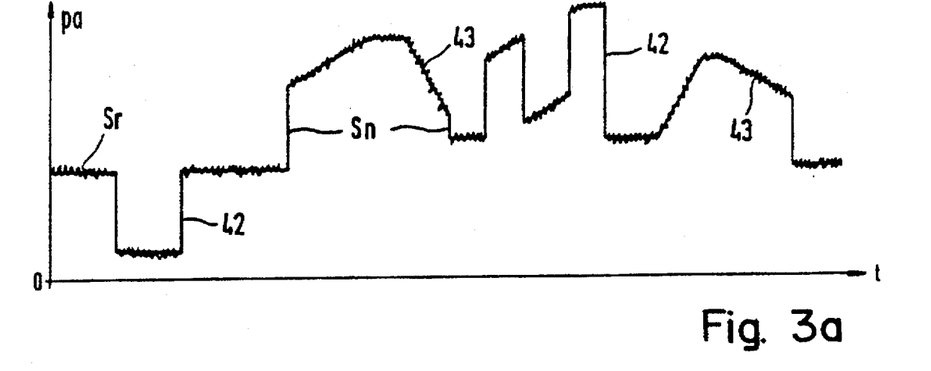
FIG. 3a–3g are schematic representation of the signals in the transmission path of a circuit arrangement shown in FIGS. 1 and 2.
Figure 3B:
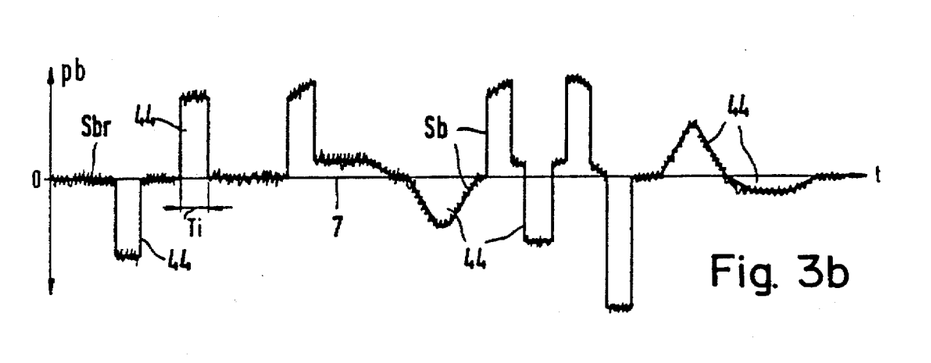
Figure 3C:
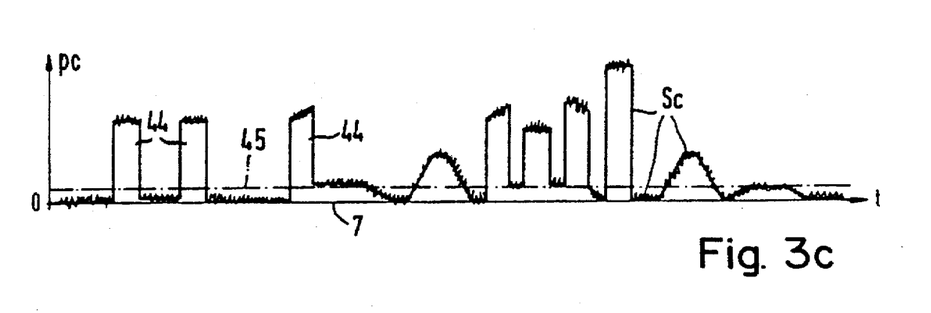
Figure 3D:
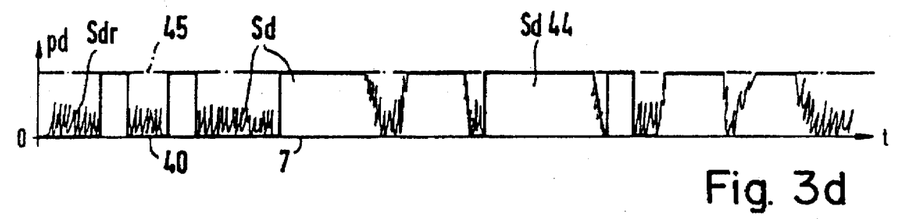
Figure 3E:
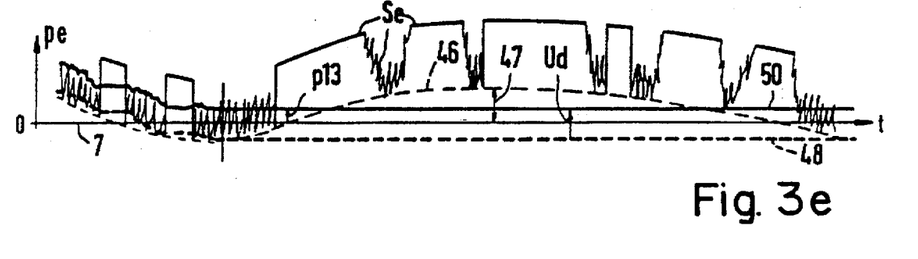
Figure 3F:
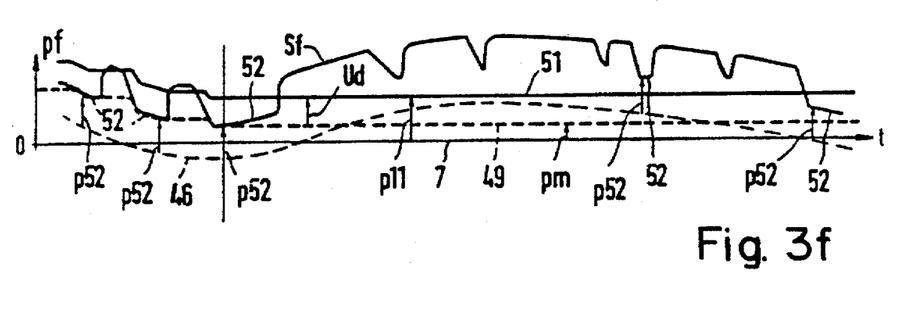
Figure 3G:
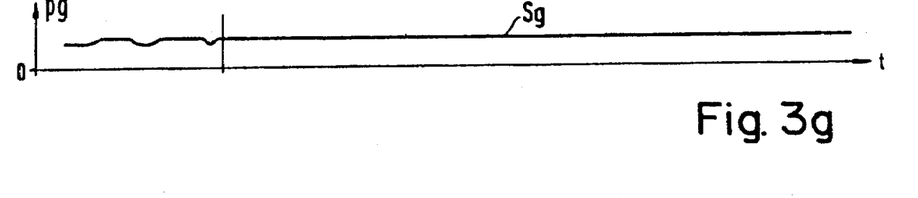

Simultaneously, the noise signal filter 5 has the task of separating the noise signal from the useful signal by means of its high-pass characteristic. The components of the useful and the noise signals passing through the noise signal filter 5 are rectified by a rectifier 6 connected downstream in such a way, that signals only occur on one side of the reference line 7 (diagrams b) and c) of FIG. 3). This measure is a prerequisite for the production of an envelope curve that acquires the level pr of the noise signals Sr in a peak envelope demodulator 8 of noise level detector 3. To improve the accuracy of the envelope curve produced by the peak envelope demodulator 8, an amplitude limiter 9 is connected upstream of the peak envelope demodulator, which limits the signal portions 44 derived from the useful signal at the output of rectifier 6, so that they do not significantly exceed the amplitudes 40 of the noise signal.

The envelope curve signal Sf at the output 10 of the peak envelope demodulator 8 guides a minimum level memory 11 in such a way, that the value of the smallest minimum level obtained so far from the guiding envelope curve signal Sf is stored in a memory element with a large storage time constant Tsp in the minimum level memory. A similar second circuit branch of a peak envelope demodulator 12 and a minimum level memory 13 is connected in parallel to the first circuit branch (circuit blocks 8 and 11). It differs from the first circuit branch in that the peak envelope demodulator 12 of the second branch does not contain any envelope curve producing, signal integrating means, but only functions as a buffer (isolating) amplifier. The reason for the branch with devices 12 and 13 is to recognize and compensate for a drift in base line 7 of the noise signal transmission from the noise level detector 3 to the storage in the minimum level memory 11. Such a drift can occur because of the effects of temperature and other components, and the environment on the components, and can easily attain the magnitude of the transmitted noise signal level. To compensate for this drift, the outputs of both minimum level memories 11 and 13 are each connected to one of inputs 14 and 15 of a signal subtracter 16, whose output signal corresponds to, or is proportional, to the noise level of the noise detector signal Sg from the useful signal limited by the noise signal filter 5. In the illustrated configuration example, this noise detector signal is routed to the control input 41 of the noise signal reduction device 2, to regulate certain values of certain signal parameters of the signal Sa transmitted by the device 2, for an optimum noise reduction in transmission channel 1.

Figure 2:
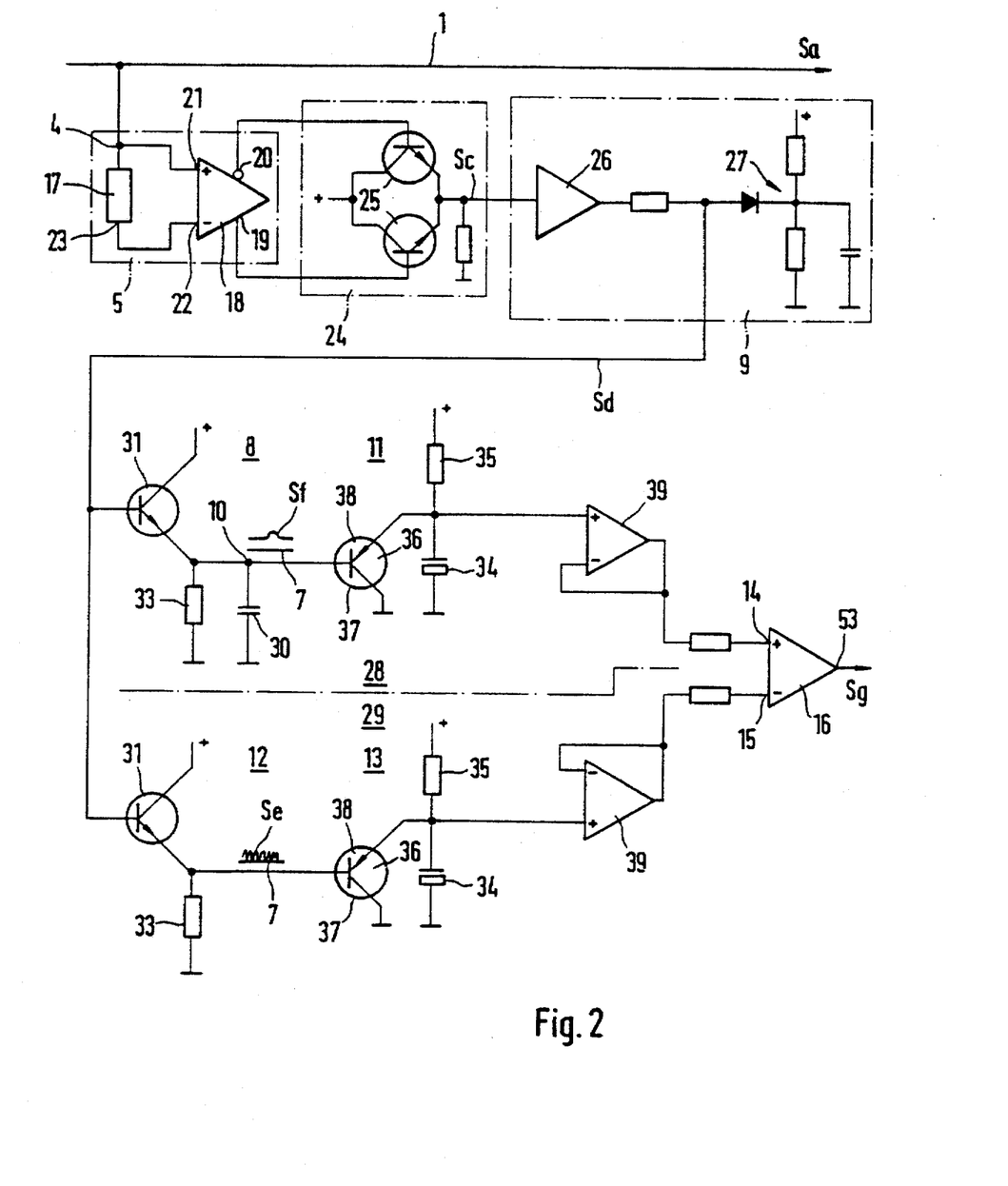
FIG. 2: a circuit example of a device for producing a noise detector signal that corresponds to the noise level.

In a simplified illustration, FIG. 2 shows an advantageous configuration of the noise level detector 3 depicted in the block circuit diagram of FIG. 1. In the illustrated configuration example, the noise signal filter 5 connected to the transmission line 1 consists essentially of a delay unit 17 and a differential amplifier 18 with a non-inverting signal output 19 and an inverting signal output 20. One of the signal inputs of the differential amplifier 18, which functions as a subtracter, is connected to the input of the delay unit 17, the other signal input 22 of the differential amplifier is connected to the output 23 of the delay unit 17. The delay time Tv1 of delay unit 17 is designed to determine the desired frequency of the noise signal Sr to be acquired, and is equal to or smaller than a predetermined maximum pulse width Ti of a differentiating pulse 44 produced by the differentiation of a signal jump 42 in the useful signal Sn. Both outputs 19 and 20 of the differential amplifier 18 lead to both inputs of a full-wave rectifier 24, consisting in the illustrated configuration example of two transistors 25 connected opposite each other in a symmetrical device. In the illustrated configuration example, the amplitude limiter 9 connected downstream of the full-wave rectifier 24, consists of an amplifier 26 and a separate limiting circuit 27, whose limitation can easily be adapted to the requirements of the following circuit arrangement. The circuit arrangement following the amplitude limiter consists of two essentially identical, parallel connected circuit branches 28 and 29, which only differ in that the peak envelope demodulator 8 of the first circuit branch 28 contains an integrating capacitor 30, which produces the envelope curve. In the illustrated configuration example, the peak envelope demodulator 8 of the first circuit branch consists of a buffer amplifier 31 and a subsequent integrating circuit, consisting of a discharge resistor 33 and the integration capacitor 30, whose time constant Tzf is larger than the period of the smallest noise signal frequency detected by noise level detector 3. In the illustrated configuration example, the minimum level memory 11, connected downstream of the peak envelope demodulator 8, consists of a charging capacitor 34, which is charged by a charging resistor 35 with a high storage time constant Tsp, and a discharge path in the form of the collector-emitter-path 36 of a transistor 37, whose control path 38, the base-emitter-path in the illustrated configuration example, is located between output 10 of the peak envelope detector 8 and the end of the storage capacitor 34, which stores the level value. The second circuit branch 29 is identical to the first circuit branch 28, except for the integration capacitor, missing from the second circuit branch 29 at the output of the buffer amplifier 31 of peak envelope demodulator 12. Both circuit branches 28 and 29 are connected on the output side by one buffer amplifier 39 each to the input 14 or 15 of a signal subtracter 16, in the form of a differential amplifier.

The signal process by the noise level detector 3 will be explained in greater detail by means of diagrams a) to g) in FIG. 3. Diagram a) schematically represents an example of a useful signal Sn, transmitted in transmission channel 1 as a video signal of a video line. A noise signal Sr is superimposed on this video signal Sn. This mixture of signals Sa, illustrated in diagram a), is located at input 4 of noise signal filter 5. The high-pass character of the noise signal filter produces an output signal Sb, shown in diagram b), for example at the non-inverting output 19 of differential amplifier 18. Because of the high-pass character of noise signal filter 5 in the frequency range of the noise signals, the output signal Sb of the noise filter oscillates at time periods immediately around a reference line 7, in which the useful signal Sn does not change its level. Instead of signal jumps 42 or very steep signal flanks 43, signal parts 44 occur in the filtered output Sb of the noise signal filter, which correspond to differentiated parts of the useful signal Sn, and which can cover significant parts of the noise signal oscillating around the reference line in the filtered output of the noise signal filter 5. For that reason, the noise signal filter is configured in such a way, that the time expansion of the parts 44 of the useful signal, formed by the differentiation characteristics of noise signal filter 5, is as small as possible. To prevent information gaps that disturb the subsequent envelope curve formation, and to obtain a reference line 7 for the envelope curve, all the signals are arranged on one side of the reference line 7 by a full-wave rectifier, so that the signal process Sc shown in diagram c) can take place. The rectified signal Sc is amplified and limited by the downstream amplitude limiter 9 in such a way, that the noise signal located immediately on reference line 7 is never limited, while the excess parts 44 of the useful signal are limited on a controlled reference line 45 in such a way, that they only slightly exceed the largest level of the noise signal that can be anticipated above the reference line 7, as illustrated schematically in diagram d) for the output signal Sd of amplitude limiter 9. Because of the effects of temperature and other environmental and interference influences on the components of the noise level detector 3, the signal Sd routed to the peak envelope demodulators 8 and 12 can be superimposed on a drift of the reference line 7. This causes the signal reference line 46, shown by dashes in diagrams e) and f), to deviate from the system reference line 7 by a deflection 47, which may be within the magnitude of the noise signal level. Diagram e) depicts the output signal Se of amplitude limiter 9, which contains a drift 46 as the output signal of the buffer amplifier 31 corresponding to the peak envelope demodulator 12, while diagram f) depicts the envelope curve superimposed on the same drift signal 46 as the output signal Sf of peak envelope demodulator 8. This drift 46 is extremely compressed in both diagrams, for easier viewing. In addition, both diagrams e) and f) contain a thickly dashed line 48 or 49, which in both instances represents the lowest value obtained so far of the signal Se or Sf, which controls the input of the minimum level memory 11. Diagrams c) and f) also contain a heavier line 50 or 51, which occurred due to a vertical shift with respect to time axis t of lines 48 and 49, for the latest minimum value of the signal SE or Sf around the differential voltage Ud of control path 38 of the follow-up control element 37 of minimum level memory, in the switched-on condition of the small follow-up time constant Tn1 of the minimum level memory, and which represents the stored level values p11 and p13 of both minimum level memories 11 and 13. The envelope curve signal Sf, formed by the peak envelope demodulator 8 from the output signal Sd of the amplitude limiter 9, contains a signal level p52 in the places that are not disturbed by the differentiation parts 44 of the useful signal, which is directly superimposed on the noise signal and is proportional to the noise level pr of the useful signal. The storage time constant Tsp of the minimum level memory is adjusted so that the storage condition of the storage capacitor does not noticeably change during two neighboring, but extremely widely separated undisturbed places 52 of envelope curve Sf. The minimum level memory 12 in the second circuit branch 29 does not scan the level of the envelope curve of output signal Sd from amplitude limiter 9, rather the minimum value of the output signal Sd of amplitude limiter 9, so as to acquire the signal reference line 46 that is subjected to drift, and store it as a level value p13 corresponding to the drift. This level value p13, which is the output signal 50 at the output of minimum level memory 13 of the second circuit branch 29, is subtracted in the downstream signal subtracter 16 from the level value p11 of the lowest point so far in envelope curve Sf of the output signal Sd superimposed on drift 46, stored in the minimum level memory 11 of the first circuit branch 28, and represented by the output signal 51 of minimum level memory 11, so that a noise detector signal Sg is produced at the output 53 of signal substracter 16, which is free of drift 46 and the differential voltage Ud of the control path 38 in the minimum level memories, and which corresponds with relative accuracy to the level of the noise signal superimposed on the useful signal.

I claim:

1. A device for producing a noise detector signal (Sg), whose signal value (pg) corresponds to the noise level (pr) of a noise signal (Sr) that is superimposed on a useful signal (Sn), said device comprising:

a noise signal filter (5) connected to a transmission channel (1) assigned to the useful signal containing the noise signal, for generating a first signal (Sb) that corresponds to the noise signal (Sr) and the differentiation of the useful signal (Sn), a rectifier (6, 24), connected downstream of the noise signal filter (5), for generating a second signal (Sc) that corresponds to the rectification of the first signal (Sb), an amplitude limiter (9), connected downstream of the rectifier (6, 24), for generating a third signal (Sd) that corresponds to the amplitude limitation of the second signal (Sc), an envelope demodulator (8) containing at least one active component (31), connected downstream of the amplitude limiter (9), for producing an output signal (Sf) that corresponds to the envelope of the third signal (Sd) which contains areas having the actual level of the noise signal (Sr), and a minimum level memory circuit (11), connected downstream of the envelope demodulator (8), for storing and transmitting the lowest level (pm) of the envelope demodulator's output signal (Sf).

2. A device as in claim 1, characterized in that the rectifier (6) is a full-wave rectifier (24).

3. A device as in claim 1, characterized in that the noise signal filter (5) contains a signal delaying device (17), having an input and an output, said signal delaying device in the noise signal transmission path, whose delay time (Tv1) is about the same or smaller than a predetermined maximum pulse width (Ti) of a differentiation pulse (44) produced during the differentiation of a jump (42) in the useful signal (Sn), said device further having a subtracter (18) having one input (21) connected to the input of the signal delaying device (17), and another input (22) connected to the output of the signal delaying device.

4. A device as in claim 4, characterized in that the signal subtracter (18) contains a signal inverting output (20) and a not inverting signal output (19), the rectifier (6) is a full-wave rectifier (24), and that one input each of the full-wave rectifier (24) is connected to the inverting and to the not inverting output of the signal subtracter (18).

5. A device as in claim 1, characterized in that the minimum level memory circuit (11, 13) contains a memory condenser (34) with a high storage time constant (Tsp) and a discharge path (36) (load path) that can be controlled by an input signal, with a tracking time constant (Tnf) that is smaller than the time constant (Thk) of the envelope demodulator (8).

6. A device as in claim 1, characterized by a subtracter (16) having first and second inputs (14, 15) and wherein the device is further characterized by a second envelope demodulator (12) having an input connected to the output of the amplitude limiter (9), and still further characterized by a second minimum level memory circuit (13) connected downstream of the second envelope demodulator (12), said second memory circuit having an input connected to the output of the second envelope demodulator (12), and also having an output connected to the second input (15) of the signal subtracter (16), while the output of the first minimum level memory circuit (11) is connected to the first input (14) of the second envelope demodulator (12).

7. A device as in claim 6, characterized in that the envelope demodulators (8, 12) are identical except for the time constant (Thk) of the two envelope demodulators.

8. A device for producing a noise detector signal (Sg), whose signal value (pg) corresponds to the noise level (pr) of a noise signal (Sr) that is superimposed on a useful signal (Sn), said device having a noise signal filter (5) connected to a transmission channel (1) assigned to the useful signal containing the noise signal, the noise signal filter for generating a first signal (Sb) that passes the noise signal (Sr) and differentiates the useful signal (Sn), characterized by a rectifier (6, 24), connected downstream of the noise signal filter (5) for generating a second signal (Sc) that rectifies the differentiated useful signal (Sn) and noise signal (Sr), an amplitude limiter (9), connected downstream of the rectifier (6,24) for generating a third signal (Sd) that corresponds tO the amplitude limitation of the second signal (Sc), a first envelope demodulator (8) connected downstream of the amplitude limiter (9), for producing an output signal (Sf) that corresponds to the envelope of the third signal (Sd) which contains areas having the actual level of the noise signal (Sr), a first minimum level memory circuit (11) connected downstream of the first envelope demodulator (8), for storing and transmitting at an output the lowest level (pm) of the envelope demodulator's output signal (Sf), a second envelope demodulator (12) having an input connected downstream of the amplitude limiter (9) for producing a fourth signal (Se) that corresponds to the level of the limited useful signal (Sn) which contains the noise signal (Sr), a second minimum level memory circuit (13) connected downstream of the second envelope demodulator (12), for storing and transmitting at an output the lowest level of the second envelope demodulator's fourth signal (Se), and a subtracter (16) having first and second inputs (14, 15) respectively connected to the outputs of the first and second minimum level memory circuits, with the output of the subtracter generating the noise detection signal (Sg).

9. A device as in claim 8, characterized in that the first and second envelope demodulators (8, 12) are identical except for the time constant (Thk) of the two envelope demodulators.

10. A device for producing a noise detector signal (Sg), whose signal value (pg) corresponds to the noise level (pr) of a noise signal (Sr) that is superimposed on a useful signal (Sn), said device having a noise signal filter (5) connected to a transmission channel (1) assigned to the useful signal containing the noise signal, the noise signal filter for generating, a first signal (Sb) that passes the noise signal (Sr) and differentiates the useful signal (Sn), characterized by a rectifier (6, 24), connected downstream of the noise signal filter (5) for generating a second signal (Sc) that rectifies the differentiated useful signal (Sn) and noise signal (Sr), an amplitude limiter (9), connected downstream of the rectifier (6,24) for generating a third signal (Sd) that corresponds to the amplitude limitation of the second signal (Sc), an envelope demodulator (8) connected downstream of the amplitude limiter (9) for producing an output signal (Sf) that corresponds to the envelope of the third signal (Sd) which contains areas having the actual level of the noise signal (Sr), and a minimum level memory circuit (11) connected downstream of the peak envelope demodulator (8), for storing and transmitting the lowest level (pm) of the envelope demodulator's output signal (Sf), and wherein the noise signal filter (5) contains a signal delaying device (17), having an input and an output, said signal delaying device in the noise signal transmission path, whose delay time (Tv1) is about the same or smaller than a predetermined maximum pulse width (Ti) of a differentiation pulse (44) produced during the differentiation of a jump (42) in the useful signal (Sn), said device further having a subtracter (18) having one input (21) connected to the input of the signal delaying device (17), and another input (22) connected to the output of the signal delaying device.

11. A device as in claim 10, characterized in that the signal subtracter (18) contains a signal inverting output (20) and a not inverting signal output (19), the rectifier (6) is a full-wave rectifier (24), and that one input each of the full-wave rectifier (24) is connected to the inverting and to the not inverting output of the signal subtracter (18).

* * * * *

UNITED STATES PATENT AND TRADEMARK OFFICE
CERTIFICATE OF CORRECTION

PATENT NO. : 5,680,420
DATED : October 21, 1997
INVENTOR(S) : Gerd Reime

It is certified that error appears in the above-identified patent and that said Letters Patent is hereby corrected as shown below:

On the title page item

[57], In the Abstract, line 3, "mutes" should be --routes--.

Signed and Sealed this

Thirty-first Day of March, 1998

*Attest:*

BRUCE LEHMAN

*Attesting Officer*     *Commissioner of Patents and Trademarks*